(12) United States Patent
Khabashesku et al.

(10) Patent No.: US 8,449,854 B2
(45) Date of Patent: May 28, 2013

(54) METHOD FOR PREPARATION OF NEW SUPERHARD B-C-N MATERIAL AND MATERIAL MADE THEREFROM

(75) Inventors: Valery N. Khabashesku, Houston, TX (US); Vladimir P. Filonenko, Troistk Moskovskaya Oblast (RU); Valeri A. Davydov, Troistk Moskovskaya Oblast (RU)

(73) Assignee: William Marsh Rice University, Houston, TX (US)

( * ) Notice: Subject to any disclaimer, the term of this patent is extended or adjusted under 35 U.S.C. 154(b) by 661 days.

(21) Appl. No.: 12/524,951

(22) PCT Filed: Jan. 29, 2008

(86) PCT No.: PCT/US2008/052345
§ 371 (c)(1),
(2), (4) Date: Jan. 27, 2010

(87) PCT Pub. No.: WO2008/094933
PCT Pub. Date: Aug. 7, 2008

(65) Prior Publication Data
US 2010/0143230 A1  Jun. 10, 2010

Related U.S. Application Data

(60) Provisional application No. 60/898,170, filed on Jan. 29, 2007.

(51) Int. Cl.
| | |
|---|---|
| C01B 35/00 | (2006.01) |
| B29C 67/00 | (2006.01) |
| H05B 6/00 | (2006.01) |
| H05B 6/64 | (2006.01) |
| B24D 3/02 | (2006.01) |
| C09C 1/68 | (2006.01) |

(52) U.S. Cl.
USPC ........... 423/276; 264/125; 264/434; 264/432; 51/307; 51/309

(58) Field of Classification Search ..................... None
See application file for complete search history.

(56) References Cited

U.S. PATENT DOCUMENTS 4,187,083 A * 2/1980 Wedlake et al. ............... 51/307
5,139,901 A * 8/1992 Kawaguchi et al. .......... 429/213
(Continued)

OTHER PUBLICATIONS

Khabashesku et al.; DTIC Public Technical Progress Report; Jul. 10, 2000.*
(Continued)

Primary Examiner — Guinever Gregorio
(74) Attorney, Agent, or Firm — Winstead PC (57) ABSTRACT

According to some embodiments, a method of preparing a superhard material involves using mixtures of boron with carbon nitride of $C_3N_4$ stoichiometry as precursors. The $C_3N_4$ may be nanospherical. The result of chemical interaction of these components is the formation of new ternary compound B—C—N compound with a cubic structure. According to some embodiments, the composition is $BC_xN$, where x is about 0.5. According to some embodiments, the composition is $BC_xN$, where x is about 0.2. According to some embodiments, the compound has a unit cell parameter a=3.645±0.005 Å. According to some embodiments, the unit cell parameter a is about 3.655 Å. Synthesis is carried out under the conditions of thermodynamic stability of diamond at pressures higher that 6.0 GPa and temperatures above 1000° C. The starting components are taken according to the following ratio: boron—20-60 wt. %, $C_3N_4$—40-80 wt. %.

9 Claims, 5 Drawing Sheets

U.S. PATENT DOCUMENTS

| | | | | |
|---|---|---|---|---|
| 5,866,059 | A * | 2/1999 | Fujiwara et al. | 264/430 |
| 6,759,128 | B1 | 7/2004 | Zhao et al. | |
| 6,945,857 | B1 | 9/2005 | Doan et al. | |
| 7,815,733 | B2 * | 10/2010 | Iwai et al. | 117/79 |
| 7,938,997 | B2 * | 5/2011 | Zhao et al. | 264/125 |

OTHER PUBLICATIONS

Aldinger et al.; Structure and Bonding vol. 101, p. 42; 2002.*

Khabashesku, et al., "Carbonitride Nanomaterials, Thin Films, and Solids", Adv. Eng. Mater., 4:2002, pp. 671-675.

Gago, et al; "X-Ray absorption study of the bonding structure of BCN compounds enri ed in carbon by CH4 ion assistance", Diamond Rel. Mater., 11:2002, pp. 1295-1299.

International Search Report and Written Opinion for PCT/US2006/052345 mailed Jun. 6, 2008.

Badzian, "Cubic Boron Nitride-diamond mixed crystals", Mat. Res. Bull., 16:1981; pp. 1385-1393.

Nakano, et al., "Segregative Crystallization of Several Diamond-like Phases from the Graphitic BC2N without an Additive at 7.7 GPa", Chem. Mater., 6:1994, pp, 2246-2251.

Knittle, et al., "High-pressure synthesis, characterization and equation of state of cubic C-BN solid solutions", Phys. Rev. B, 51:1995, pp. 12149-12155.

Kurdyumov, et al., "Synthesis and Structure of Ternary Phases in the B-C-N System (A Review)", J. Superhard Mater., 21:1999, pp. 1-15.

Solozhenko, et al.; "Synthesis of superhard cubic BC2N", Appl. Phys. Lett, 78:2001, pp, 1385-1387.

Solozhenko, et al., "Mechanical properties of cubic BC2N, a new superhard phase", Diamond Rel. Mater., 10:2001, pp. 2228-2231.

Zhao, et al., "Superhard B-C-N materials synthesized in nanostructured bulks" J. Mater. Res., 17:2002, pp. 3139-3145.

Solozhenko, el al., "Synthesis of superhard materials", Materials Today, 8:2005, pp. 44-51.

* cited by examiner

METHOD FOR PREPARATION OF NEW SUPERHARD B-C-N MATERIAL AND MATERIAL MADE THEREFROM

CROSS-REFERENCE TO RELATED APPLICATION

This application claims priority to and benefit of U.S. Provisional Application Ser. No. 60/898,170, filed on Jan. 29, 2007, entitled: METHOD FOR PREPARATION OF NEW SUPERHARD B—C—N MATERIAL AND MATERIAL MADE THEREFROM, by inventors Valery N. Khabashesku, Vladimir P. Filonenki, and Valeri A. Davydov.

STATEMENT OF GOVERNMENT SPONSORSHIP

The present invention was made with United States Government support under Grant Number N RUE 2-2659-MO-05, awarded by the US Civilian Research and Development Foundation for Independent States of the Former Soviet Union (CRDF). The U.S. Government has certain rights in the invention.

FIELD OF INVENTION

The present invention relates in general to synthesis of new B—C—N superhard materials.

BACKGROUND OF INVENTION

Superhard materials find applications in tools manufacturing industries for equipping the drill bits, cutters, saws, etc., used for treatment of tough alloys and composites, or in microelectronics as semiconductors.

There are known conventional methods for preparation of synthetic diamonds from mixtures of carbon-containing materials and alloy-catalysts (solvents) for initiation of the diamond synthesis process under conditions of high pressures and high temperatures followed by quenching to ambient temperature, product isolation and chemical purification.

Similarly, there are known conventional methods for preparation of cubic boron nitride (cBN) from mixtures of starting materials and catalysts for initiation of the cBN synthesis process under similar conditions of high pressures and high temperatures followed by quenching to ambient temperature, product isolation and chemical purification. cBN is less hard than diamond, but more resistant to thermal breakdown than diamond.

There has been continuing interest in new superhard materials in efforts to discover superhard materials that are harder than cBN.

Thus, notwithstanding the foregoing, there remains a need for new superhard materials and methods of making them.

BRIEF DESCRIPTION OF INVENTION

According to some embodiments, a superhard material contains a new ternary B—C—N compound. According to some embodiments, the composition is $BC_xN$, where is about 0.5. According to some embodiments, the composition is $BC_xN$, where x is about 0.2. According to some embodiments, the compound has a unit cell parameter a=3.645±0.005 Å. According to some embodiments, the unit cell parameter a is about 3.655 Å. The compound is believed to be harder than cBN.

According to some embodiments, a method for preparing the superhard material involves using mixtures of boron with carbon nitride of $C_3N_4$ stoichiometry as precursors. The $C_3N_4$ may be nanospherical. The result of chemical interaction of these components may be the formation of the above-described ternary compound. Synthesis may be carried out under the conditions of thermodynamic stability of diamond at pressures higher that 6.0 GPa and temperatures above 1000° C. The starting components may be taken according to the following ratio: boron—20-60 wt. %, $C_3N_4$—40-80 wt. %. The conditions of pressure and temperature are within the reach of modern industrial high pressure devices and allow for scale-up development.

BRIEF DESCRIPTION OF DRAWINGS

The foregoing summary as well as the following detailed description of the preferred embodiment of the invention will be better understood when read in conjunction with the appended drawings. It should be understood, however, that the invention is not limited to the precise arrangements and instrumentalities shown herein. The components in the drawings are not necessarily to scale, emphasis instead being placed upon clearly illustrating the principles of the present invention. Moreover, in the drawings, like reference numerals designate corresponding parts throughout the several views.

The invention may take physical form in certain parts and arrangement of parts. For a more complete understanding of the present invention, and the advantages thereof, reference is now made to the following descriptions taken in conjunction with the accompanying drawings, in which.

DETAILED DESCRIPTION OF THE INVENTION

A new nano/microcrystalline cubic B—C—N material has been prepared by a high pressure-high temperature synthesis from a mixture of nanospherical graphitic carbon nitride of $C_3N_4$ stoichiometry and boron. According to some embodiments, the composition is $BC_xN$, where x is about 0.5. According to some embodiments, the composition is $BC_xN$, where x is about 0.2. According to some embodiments, the compound has a unit cell parameter a=3.645±0.005 Å. According to some embodiments, the unit cell parameter a is about 3.655 Å.

The present process uses a new chemical precursor mixture for the synthesis, such as $C_3N_4$ carbon nitride and boron. Further, the present process uses mild high pressure-high temperature conditions for the preparation of $BC_xN$ superhard material.

Preceding synthesis, nanospherical carbon nitride of $C_3N_4$ stoichiometry may be prepared according to the papers by V. N. Khabashesku et al., Rus. Chem. Bull. 2001, p. 2020-2027; V. N. Khabashesku et al., Nano Letters, 2001, 1, 743-747. This method is herein thermed a solvothermal synthesis method. Alternatively, carbon nitride of $C_3N_4$ stoichiometry may be prepared according to the process described in U.S. Pat. No. 6,428,762 and V. N. Khabashesku et al., Chem. Mater., 2000, 12, 3264-3270. This method is herein termed a solid state chemistry method. According to either method, carbon nitride powder of $C_3N_4$ stoichiometry may be prepared from cyanuric chloride and lithium nitride. As disclosed by the former references with respect to the solvothermal method, the material produced by the solvothermal method may be composed of nanosize spheres built of curved multi-layers of graphite-like carbon nitride with the distance of 3.415 Å between layers.

Synthesis may involve mixing the weight amounts of $C_3N_4$ and boron powders so as to form a mixture. The present approach to synthesis of ternary phases in the B—C—N system may involve the use of mechanical mixtures of carbon nitride and boron as precursors. Thus the mixing may be mechanical mixing. The boron powder may be a conventional nanosize powder such as commonly used in steel synthesis. The mixture may be loaded into a high pressure chamber. According to some embodiments, the mixture may be loaded into a pre-assembled cell in the Toroid-type high pressure chamber. The starting components may be taken according to the following ratio: boron—20-60 wt. %, $C_3N_4$—40-80 wt. %. According to some embodiments, the starting components may be taken according to the following ratio: boron—30-50 wt. %, $C_3N_4$—50-70 wt. %. According to some embodiments, the starting components may be taken according to the following ratio: boron—35-50 wt. %, $C_3N_4$—50-65 wt. %.

The upper bound of boron in the ratio of components is selected so as to reduce synthesizing of boron carbides. The lower bound of boron in the ratio of components is selected so as to reduce decomposition of the carbon nitride.

Synthesis may involve loading the sample to a pressure of from about 6 GPa to about 12 GPa, for example from about 7.5 GPa to about 8.5 GPa, for example about 8 GPa, then raising the temperature from about 1000° C. to about 1700° C., for example from about 1400° C. to about 1600° C., for example from about 1500° C. to about 1600° C., and holding for 15 sec to 5.0 min. Thereafter the sample may be quenched to room temperature and ambient pressure and unloaded.

The lower bound of pressure is selected so as to achieve reaction. The upper bound of pressure is selected so as to be within the pressure achievable in the chamber. Larger samples may be treated at lower pressure. Thus, it is desirable to work at as low a pressure as possible. The lower bound of the temperature is selected so as to achieve reaction. The upper bound of temperature is selected so to avoid tending to lose nitrogen. The hold time is selected according to the temperature so as to allow the reaction to proceed. The hold time affects the yield. At lower temperature, a longer hold time may be selected. At higher temperatures, a shorted hold time may be selected.

Quenching may involve turning off a temperature-raising member associated with the chamber and allowing the sample to cool.

Synthesis may include a post-processing washing procedure for removal of oxygen. The oxygen may be present in boron oxide. For removal of boron oxide, several samples with the highest content of new cubic phase may be joined together and grinded, and thereafter refluxed first in a mixture of sulfuric and nitric acids, then in NaOH solution.

Following synthesis, characterization of the sample may involve X-ray diffraction, scanning electron microscopy and elemental analysis of the sample material, according to conventional methods known to one of ordinary skill in the art.

Cubic B—C—N materials are expected to be second to diamond in hardness, thus exceeding the hardness of cubic BN. The present inventors have estimated this to be the case for the present new superhard material. The new superhard B—C—N material can find applications in tool industry for drill bits, saws, etc. for treatment of hard alloys and composite materials.

The present process utilizes conditions of pressure and temperature which are within the reach of modern industrial high pressure devices and allow for scale-up development.

The following examples are included to demonstrate particular embodiments of the present invention. It should be appreciated by those of skill in the art that the methods disclosed in the examples that follow merely represent exemplary embodiments of the present invention. However, those of skill in the art should, in light of the present disclosure, appreciate that many changes can be made in the specific embodiments described and still obtain a like or similar result without departing from the spirit and scope of the present invention.

EXAMPLES

Example 1

This example illustrate a synthesis procedure.

We have succeeded in the high pressure synthesis of ternary $BC_xN$ cubic compound under a relatively low P, T parameters from the mixture of nanospherical carbon nitride of $C_3N_4$ stoichiometry and boron. Under these synthesis conditions carbon nitride decomposes and the ternary phase forms from the elements by the chemical interaction between boron, carbon and nitrogen. Under optimized synthesis conditions (pressure—7.5-8.5 GPa, temperature—1400-1600° C., exposure time—015 sec –5.0 min) and composition of the mixture (boron—30-50 wt, %, $C_3N_4$—50-70 wt. %) the yield of cubic $BC_xN$ phase consists 70-90%. Additional phases, formed as by-products in the course of synthesis, consist of mixture of boron carbides. Under lower pressures, significant amount of hexagonal phase appears in the sample; while use of the higher pressures is not economically feasible for scale up preparation of the material in larger quantities.

Example 2

This example illustrates some properties of samples synthesized according to the procedure of Example 1.

Figure 1:
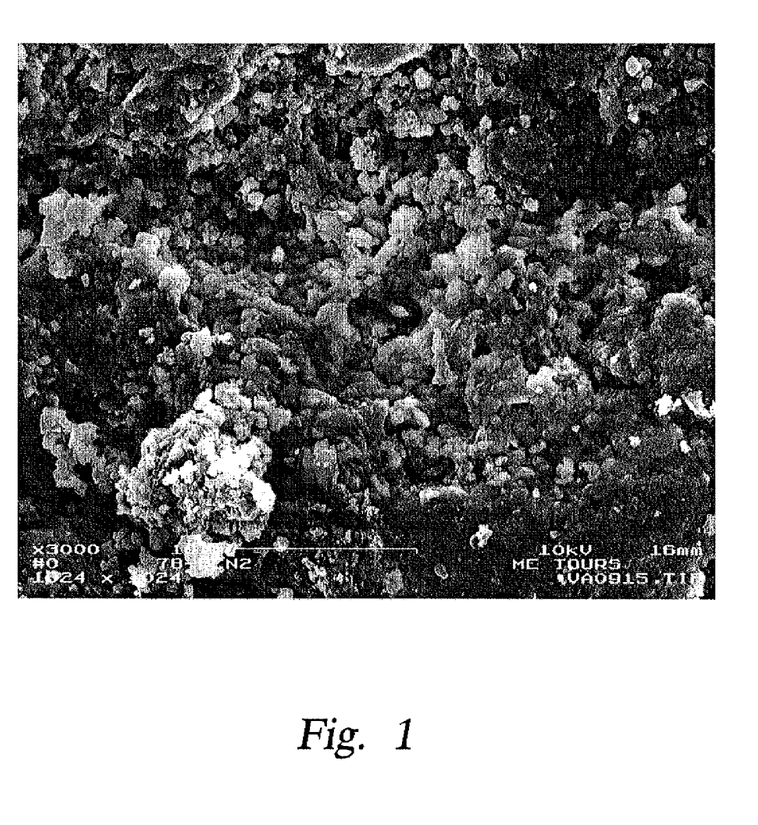
FIG. 1 shows a SEM micrograph of exemplary reaction products obtained at 8.0 Gpa and 1500° C. from a mixture of $0.5C_3N_4+0.5$ B.
Figure 2:
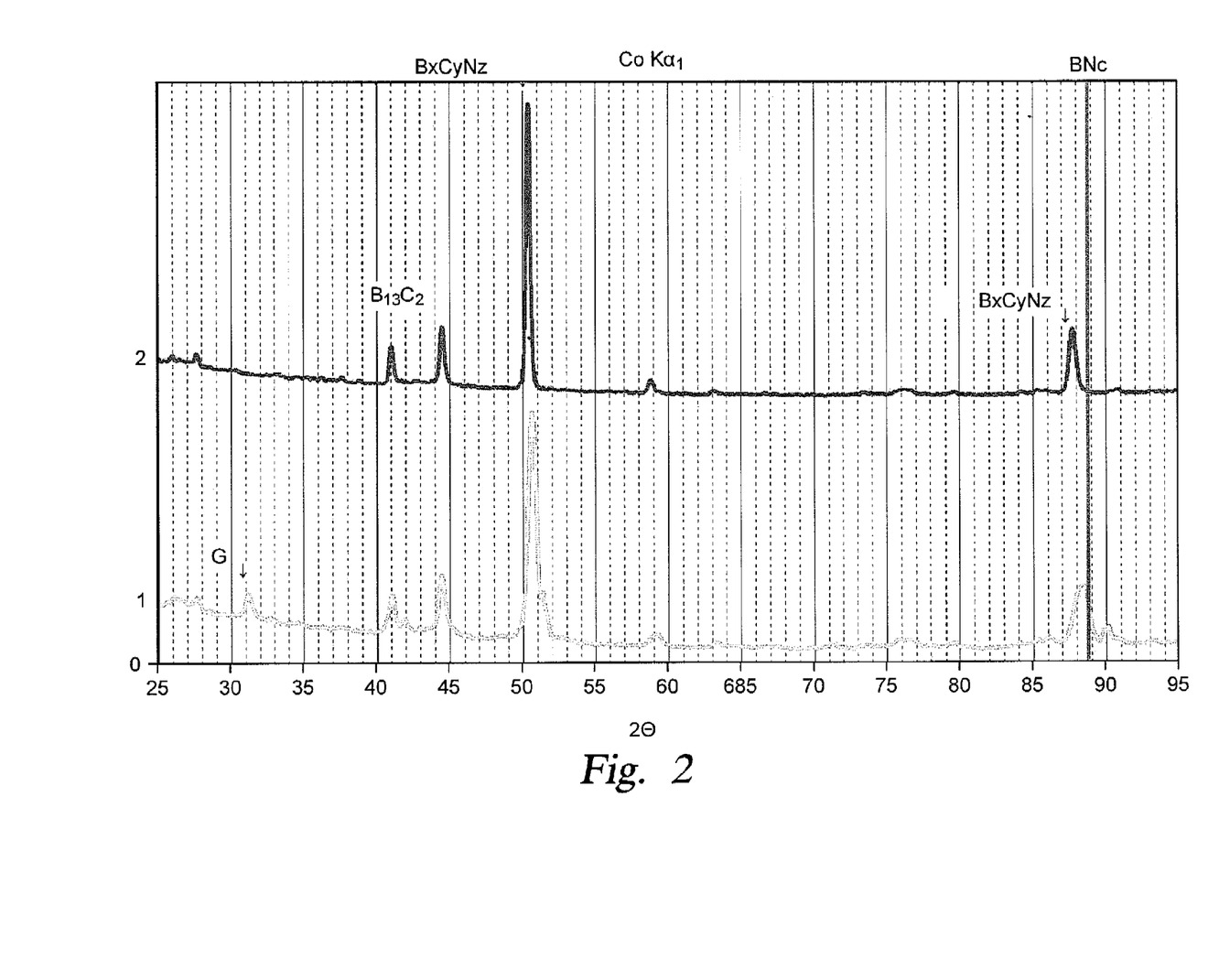
FIG. 2 shows X-ray diffraction of the synthesis products carried out at 8.0 Gpa and 1500° C., where line 1 shows results from using a comparative starting mixture of melamine $(C_3N_6H_6)+0.5$ B and line 2 shows results using an exemplary starting mixture of $0.5C_3N_4+0.5$ B.

Comparison of the X-ray diffraction and elemental analysis data for the synthesized samples with the elemental content in the precursor mixture yielded the composition of the new cubic phase to be approximately $BC_{0.5}N$. Thus, the composition was determined to be $BC_xN$, where x is about 0.5. Unit cell parameter was calculated to be 3.645±0.005 Å, which is significantly larger than the unit cell parameters for the diamond, 3.567 Å, and cubic boron nitride, 3.615 Å. All X-ray diffraction patterns show presence of 220 reflection which indicates the absence of statistical distribution of elements in the structure. Referring to FIG. 1, the crystal sizes of the ternary phase synthesized at 8 Gpa and 1500° C. do not exceed several tenths of a micron. Referring to FIG. 2, it should be noted that treatment under the same p,T parameters of mixture of boron with melamine, $C_3N_6H_6$ results in formation of not the ternary phase but virtually the pure cubic boron nitride which is proving the desirability of the hexagonal structure in the $C_3N_4$ precursor.

It will be understood that the present inventors believe that the analysis described in this example represents an initial estimate for the composition. Further refinement of sample analysis is described in Example 8.

Examples 3-8

These examples illustrates synthesis of a new cubic phase in the B—C—N system.

These examples are based in part on work reported in a prepublication manuscript.

The ternary cubic B—C—N phase has been synthesized by thermobaric treatment of $B/C_3N_4$ mixture at moderate p,T-parameters enabling large scale production. The new cubic phase has been synthesized using a nanospherical carbon nitride as precursor.

New ternary phase having a structure of cubic boron nitride with boron and nitrogen atoms partially substituted by carbon has been synthesized through high pressure-high temperature treatment of powder mixture of boron and nanospherical carbon nitride of $C_3N_4$ stoichiometry. Based on cubic structure refinement, done through Rietveld analysis of X-ray diffractogram, composition of new phase was estimated to be $BC_{0.2}N$. The relatively low p, T-parameters (for example 8 GPa and 1500° C.) found to be sufficient for high yield synthesis of new B—C—N phase are of extraordinary importance since they enable reproducible and scaled-up preparation of this material in large quantities on industrial scale.

The goal of the work was to study the possibility for high pressure synthesis of diamond-like B—C—N phases at much lower p,T-parameters that will enable preparation of large volume samples and scale-up of the material for complex analysis of its structure, physical and mechanical properties and applications.

The present studies have shown that addition of boron to carbon nitride creates a prospect for a number of chemical reactions and phase transitions to occur under high pressures. Formation of boron carbides, carbon nitride phases, graphite and ternary B—C—N compounds becomes feasible. The structure of the products formed depends on composition of the reaction mixture, p,T-treatment parameters, extent of openness of the reaction volume for releasing a volatile components, kinetics of carbon nitride decomposition and formation of high pressure phases.

The obtained results lead to conclusion that by using mixtures of nanospherical modification of carbon nitride and boron as precursors, both hexagonal and cubic phases of boron nitride and ternary phases can be synthesized, depending on composition of the mixture, p,T-parameters and treatment conditions. The ternary cubic B—C—N phase was for the first time synthesized at the pressure of 8 GPa which enables preparation of this material in large quantities needed for broad scale studies.

In our experiments, we are certain of ongoing diffusion mechanism enabling the transport of boron atoms to growing crystals of cubic phase.

The experimental data accumulated to date show that composition of ternary phase in part of carbon content can change only insignificantly. To finally answer the question on stoichiometry of new phase and its properties work is in progress on scale-up synthesis and isolation of the single phase from synthesized material.

General Experimental Procedures.

Thermobaric treatment of 5 mm diameter and 3 mm high pellets obtained was carried out at pressures ranging from 6 to 8 GPa in the high pressure chambers of "toroid" type. In this chamber, a high pressure cell made of lithographic stone was pressed between two anvils forged from hard alloy. Loading of the samples to a particular pressure was followed by their heating and isothermal holding at the required temperatures (from 500 to 1600° C.). The exposure times varied in different experiments from 5 to 300 s at constant temperature. In this chamber lithographic limestone cell was pressed between two hard metal anvils of a special profile. After stabilization of applied pressure, samples were heated up to desirable temperature in the range of 500-1600° C., held for 5 to 300 s. Thereupon, the sample was quenched to room temperature before the pressure was released. For experiments, carried out at pressures of 10-15 GPa, samples of 3 mm diameter and 1.5-2 mm height were placed into a cell between plane anvils made of diamond-silicon carbide composite. The pressure in the reaction chamber was determined according to calibration curves demonstrating the phase transitions for Bi (2.55 and 7.7 GPa) and ZnS (15 GPa). The temperature measurements were taken by introducing a chromel-alumel thermocouple into the cell.

Phase analysis of the samples was carried out on Bruker AXS diffractometer. X-ray diffraction data for the structure refinement of the B—C—N phase was collected on a Stoe Stadi/P diffractometer with a rotating sample in symmetric transmission mode. A symmetric focusing germanium monochromator (focal distance=440 mm) was used to give pure $CuK\alpha_1$ radiation ($\lambda$=1.540598 Å). The diffraction data were collected with a small linear position sensitive detector (PSD) covering 6.4° in 2θ. The 2θ range measured was 30°<2θ<130°. The software program package GSAS was used for the Rietveld refinement. The peak shapes were described by a symmetric pseudo-Voigt function. Microstructure studies and elemental analysis were done with scanning electron microscope (SEM) DSM 982 Gemini.

Example 3

This example illustrates analysis and mixing of boron and $C_3N_4$.

An elemental analysis of $C_3N_4$ was carried out. According to this elemental analysis, nanospherical powder of $C_3N_4$ contained about 10% oxygen, both in the form of surface-adsorbed molecules and chemically bonded groups. We have utilized a commercial boron powder having a purity not less than 99.8%, particle sizes in the range of 1-10 microns, and containing a crystalline β-phase with some amorphous component. Mixtures of boron and carbon nitride were prepared by three-times grinding in acetone with subsequent drying and pressing the powder into a pellet in a hardened steel dye.

Example 4

This example illustrations variation of reaction product with the relative amounts of boron and $C_3N_4$ in the reactant mixture.

Boron content in the reaction mixture was varied from 20 to 80 wt. %. It was found that high contents of boron lead to predominant synthesis of boron carbides, while low boron contents result in decomposition of most of the carbon nitride. Therefore, in the following examples we present the results obtained with the mixtures of $C_3N_4$ and 35-50 wt. % boron.

Example 5

This example illustrates the variation of reaction product with condition of temperature and pressure.

Figure 3:
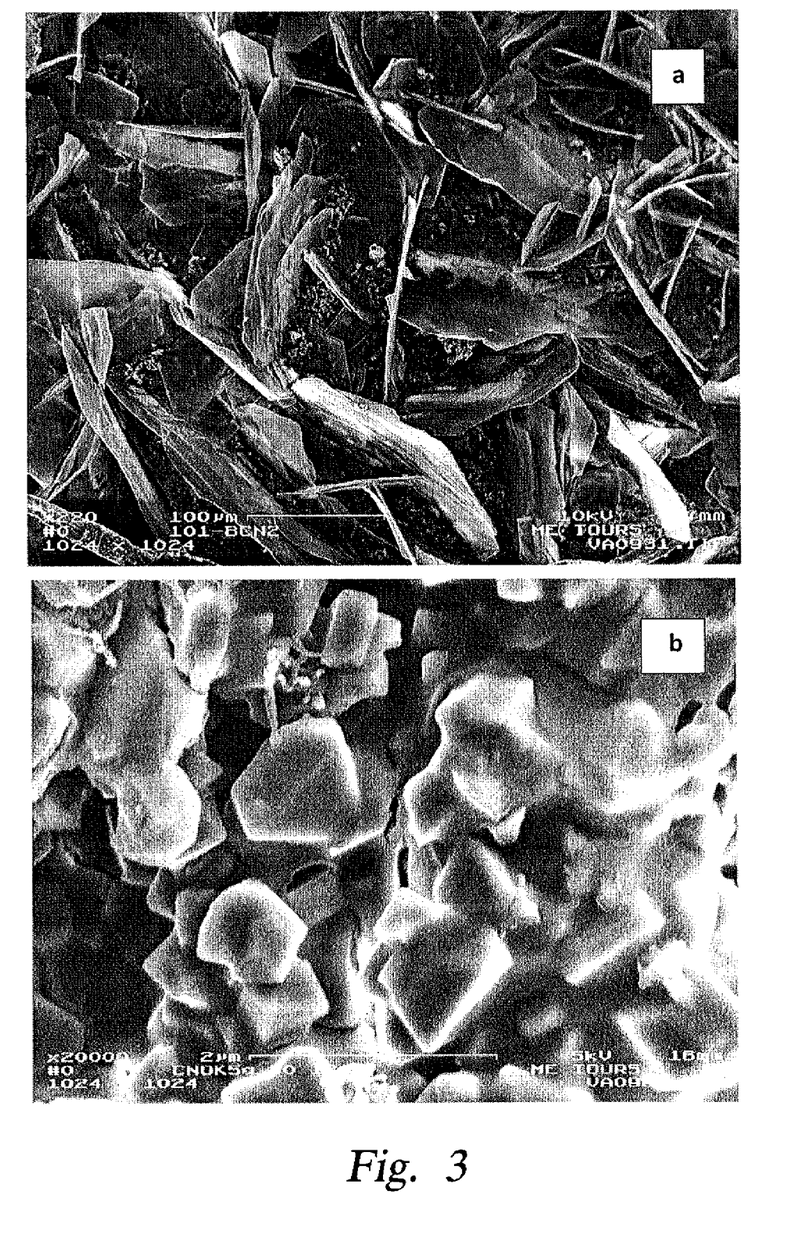
FIG. 3 shows SEM images of sample morphologies obtained by thermobaric treatment of $0.5C_3N_4+0.5$ B mixture at different p,T-parameters: (a) comparative hexagonal phase, 15 GPa, 1000° C.; (b) exemplary cubic phase, 8 GPa, 1500° C.
Figure 4:
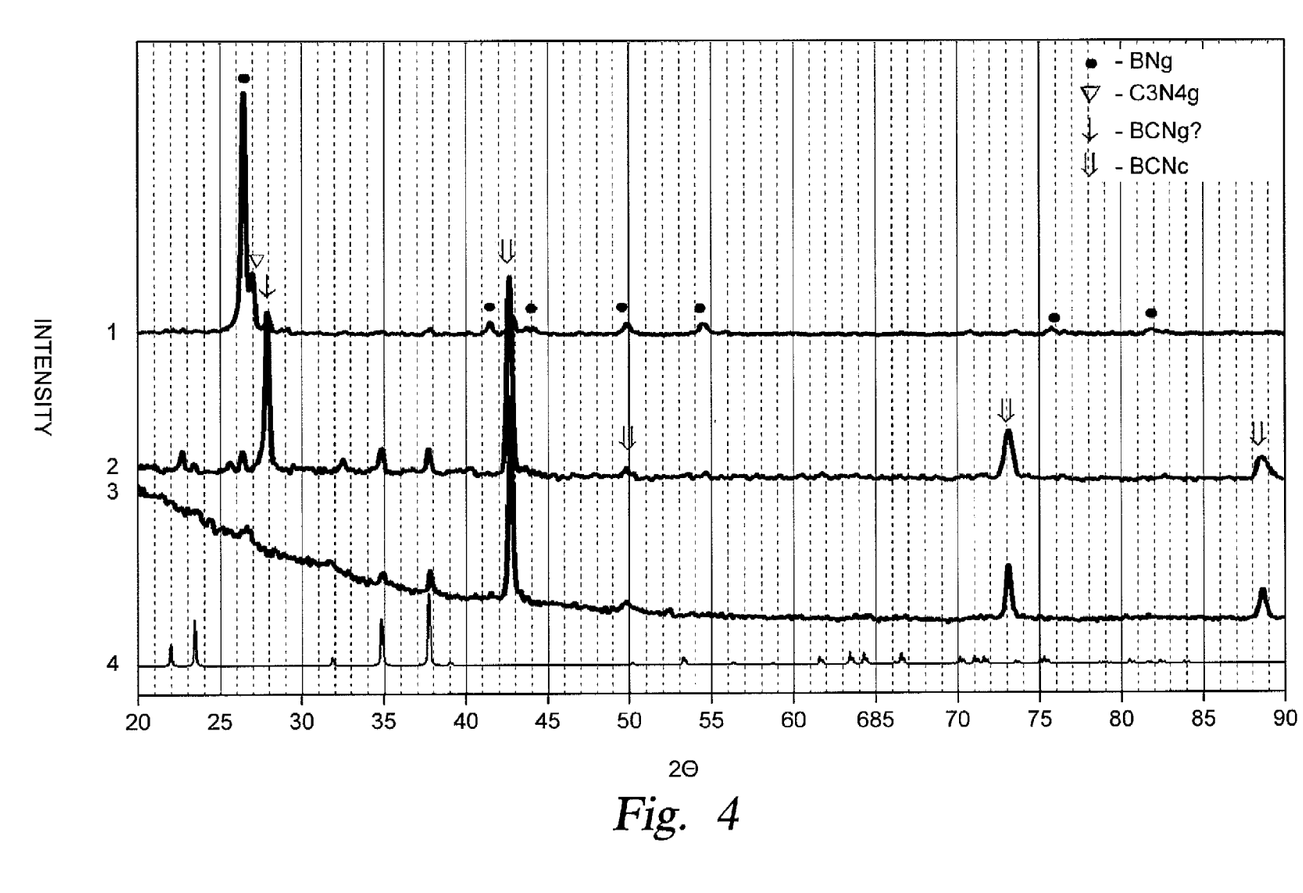
FIG. 4 shows X-Ray (Cu $K\alpha_1$) diffraction patterns obtained after thermobaric treatment of different $C_3N_4/B$ mixtures at variable p,T-parameters: 1—$0.6C_3N_4+0.4$ B, 7 GPa, 1450° C.; 2—$0.6C_3N_4+0.4$ B, 7.5 GPa, 1600° C.; 3—$0.5 C_3N_4+0.5$ B, 8 GPa. 1500° C.; and a diffraction pattern from $B_{13}C_2$: 4.

Thermobaric treatment of $C_3N_4$/B mixtures under pressure of 15 GPa and temperatures 1000-1100° C. for 300 s did not produce any signs of chemical interaction, but resulted in ordering of phases with the graphite-like structure. X-Ray diffraction of sample, synthesized from mixture of equal weight contents of carbon nitride and boron, shows the high intensity peak which corresponds to interlayer distance of 3.28 Å. As seen on SEM image in FIG. 3a, crystals of the graphite-like phase formed under pressure of 15 GPa are not quite perfect. At the same time, under pressure of 8 GPa and 1000° C. temperature boron entirely reacts with the carbon nitride yielding a cubic phase of boron nitride. Increase of the treatment temperature of $C_3N_4$/B mixtures to 1200-1600° C. under pressure of 8 GPa led to considerable acceleration of chemical interaction. Treatment times of just a few seconds became sufficient for full conversion of the precursors in the mixture. According to X-ray diffraction, the major phase formed at temperatures of 1200-1400° C. has cubic symmetry and shows peaks corresponding to cubic boron nitride. However, high pressure treatments at higher temperatures (1500-1600° C.), causes significant shifts of these peaks indicating an increase in cubic cell parameter from 3.616 Å to 3.650 Å. These data demonstrate the synthesis of new phase with the cubic symmetry. Treatment of $C_3N_4$/B mixture under lower pressure (7 GPa) and temperature kept within 1400-1500° C. range led to dramatical reduction of cubic phase content in the products and formation of mostly graphite-like modifications. Besides peaks of hexagonal boron nitride (a=3.32 Å) and carbon nitride (a=3.28 Å), X-ray diffraction has shown a peak which corresponds to an interplane distance of 3.18 Å (FIG. 4). This peak most likely belongs to a hexagonal ternary nitride phase. XRD traces 2 and 3, FIG. 4 illustrate formation of the ternary cubic B—C—N phase. XRD trace 4 is derived from G. Will and K. H. Kossobutzki, *J. Less-Common Met.*, 1976, 47, 43-48.

Example 6

This Example illustrates a particular combination of composition of reactant mixture and reactant conditions for optimal yield.

The highest yield of the cubic BCN phase has been obtained from mixtures which contained approximately equal amounts of boron and carbon nitride. Reaction was under conditions of a pressure of 8 GPa and a temperature of 1500° C. The morphology of these crystals is presented by SEM image in FIG. 3b. It can be seen that some crystallites exhibit features typical for cubic phases and particle sizes are within a submicron range.

Example 7

This Example illustrates a sample washing procedure.

According to microscopy EDX elemental analysis, all synthesized samples contained oxygen in the amount which correlated with the oxygen content in the initial carbon nitride nanopowder. It is reasonable to expect that in B—C—N system under temperature conditions studied only boron can bind oxygen to form a stable compound, most likely, amorphous oxide $B_2O_3$. The presence of this oxide in the products was reasoned on basis of observed strong moisture adsorption by the sample right after its unloading from the high pressure chamber, and elemental microanalysis of different areas of the sample. For removal of boron oxide, several samples with the highest content of new cubic phase have been joined together and grinded, and thereafter refluxed first in a mixture of sulfuric and nitric acids, then in NaOH solution. Elemental analysis showed significant changes in the composition of chemically treated powder in comparison with the calculated atomic contents for the starting $C_3N_4$/B mixture. For instance, oxygen content has been reduced from 7 to 3-4%, nitrogen—from 25 to 13-16%. Carbon content remained virtually unchanged (~18%), while boron content increased from 50 to 62-65%. Besides these elements, 0.5 at. % silicon has been detected as an impurity. The obtained results clearly show the loss of nitrogen that is most likely due to partial decomposition of carbon nitride. From the other hand, these data can not be applied for correct estimation of the composition of new cubic phase since the sample does not consist of a single phase.

Example 8

This example illustrates some properties of samples synthesized according to Example 6.

Figure 5:
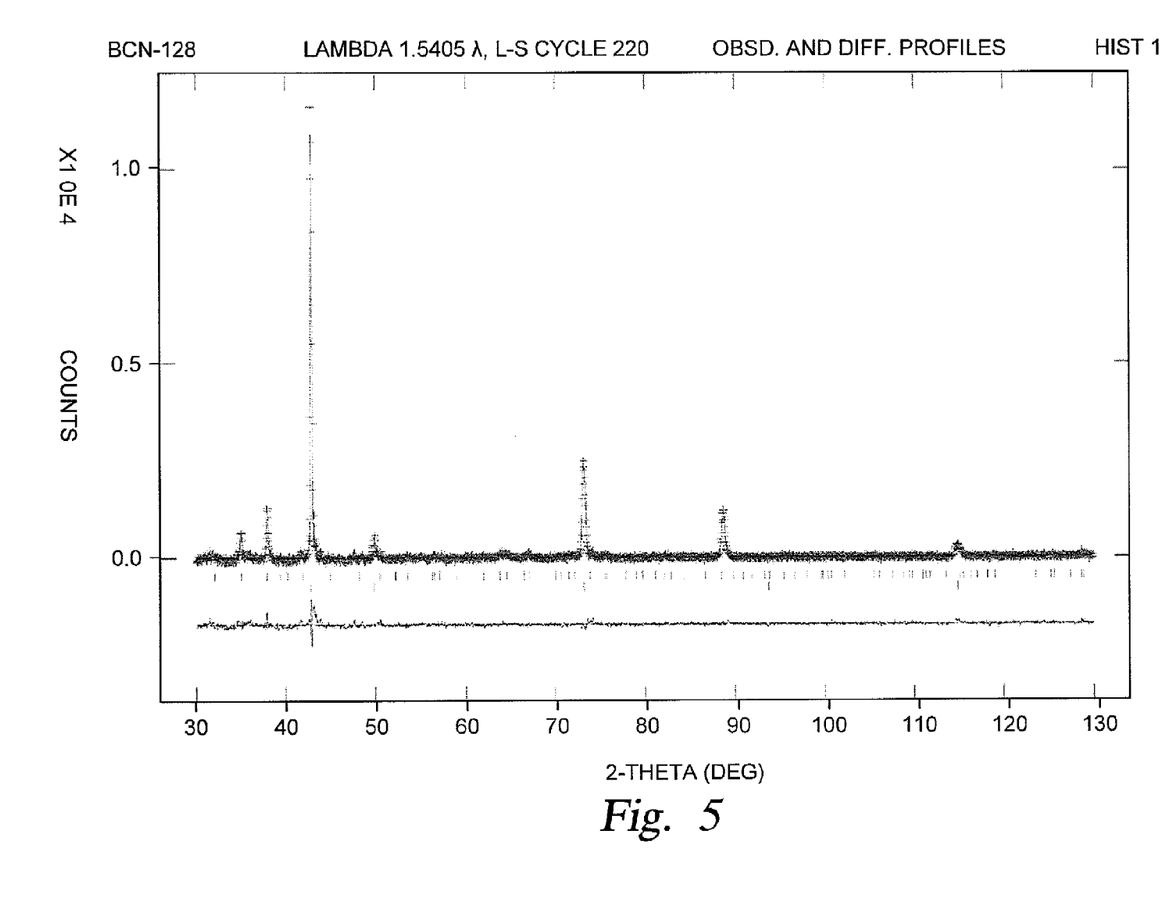
FIG. 5 shows X-ray Rietveld refinement for an exemplary B—C—N phase and comparative $B_{13}C_2$ model structures, where the upper curve illustrates the observed data and the lower one the difference between observed and calculated data, and where the positions of all allowed Bragg reflections are indicated by the row of vertical tick marks.

In addition, analysis of X-ray diffraction pattern of the sample with the highest content of new cubic phase also revealed the presence of peaks of the well-known phase of boron carbide $B_{13}C_2$. This identification gave an opportunity for conducting a refinement of B—C—N phase parameters by Rietveld approximation model (FIG. 5). In the X-ray diffraction of cubic phase, a reflection from (200) plane is present which is typical of F-43m space group. In this type of unit cell, atoms take two four-fold positions, 4a (0,0,0) and 4c (0.25,0.25,0.25). Formally, for three types of atoms only two model structures can be envisioned. In the first model structure, boron and nitrogen occupy different positions, while carbon is distributed between these two positions by partially replacing boron and nitrogen. In the second model, boron and nitrogen are in one position, and carbon is in the other.

In the course of calculations, the atomic coordinates and thermal parameters for $B_{13}C_2$, borrowed from work (G. Will and K. H. Kossobutzki, *J. Less-Common Met.*, 1976, 47, 43-48), have been fixed. For this phase, only unit cell parameters and content ratio in the sample (found to be 20(16) wt. %) have been refined. The results on B—C—N compound structure refinement based on first model are given in Tables 1 and 2. When the second model structure was used, the refinement solution could not be found. According to refinement results, unit cell parameter for ternary cubic phase is 3.655 Å, which exceeds by 1% the unit cell parameter for cubic boron nitride. This result for the cubic cell parameter is consistent with the result as reported in Example 2 of 3.645±0.005 Å, and represents a refinement of that result. The calculated composition of the new phase is $BC_{0.151}N_{1.027}$, however, if confidence interval is taken into account, the maximum content of carbon in the ternary phase may be in accordance with the $BC_{0.288}N_{1.027}$ formula. Thus, the calculated composition of the new phase is $BC_xN$, where x is about 0.2. The confidence is approximately 50%. Thus, this calculation give a range of from 0.1 to 0.3 for x. The result for the composition is consistent with the result as reported in Example 2 of x is about 0.5. The result for the composition reported in this Example is a refinement of the result reported in Example 2.

TABLE 1

Experimental details

| | |
|---|---|
| Chemical formula | $BC_{0.151}N_{1.027}$ |
| Space group | F-43m |
| Z | 8 |
| F.W. (at 298 K) | 99.247 |
| a (Å) | 3.65515(3) |
| V (Å$^3$) | 48.833(1) |
| d-calc. (g/cm$^3$) | 3.375 |
| Weight Fraction | 0.731(5) |
| $R_F$ | 0.0575 |
| $R_P$ | 0.033 |
| $R_{WP}$ | 0.0429 |
| d | 1.064 |
| Number of parameters used | 32 |

TABLE 2

Fractional atomic coordinates and equivalent isotropic displacement parameters (Å$^2$) for $BC_{0.151}N_{1.027}$.
$U_{eq} = (1/3)\Sigma_i \Sigma_j U^{ij} a^i a^j a_i a_j$

| Atom | Site | OCC | x | y | z | $U_{eq}$ |
|---|---|---|---|---|---|---|
| B | (4a) | 0.918(54) | 0 | 0 | 0 | 0.0240(10) |
| N | (4c) | 0.943(56) | 0.25 | 0.25 | 0.25 | 0.0116(7) |
| C1 | (4a) | 0.082(54) | 0 | 0 | 0 | 0.0240(10) |
| C2 | (4c) | 0.057(56) | 0.25 | 0.25 | 0.25 | 0.0116(7) |

Although the invention has been described with reference to specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore, contemplated that the claims will cover any such modifications or embodiments that fall within the true scope of the invention.

What is claimed is:

1. A method for preparing a superhard material, said method comprising:
    forming a mixture of a first component comprising boron and a second component comprising $C_3N_4$,
    wherein the mixture comprises between about 35 wt. % and about 50 wt. % of the first component, and between about 50 wt. % and about 65 wt. % of the second component; and
    allowing the mixture to undergo chemical interaction of the first component and the second component,
    wherein the chemical interaction forms a ternary B—C—N compound,
    wherein the superhard material comprises the ternary B—C—N compound, and
    wherein the ternary B—C—N compound has a composition B C$_x$N, wherein x is about 0.5.

2. The method according to claim 1, wherein the $C_3N_4$ is nanospherical.

3. The method according to claim 1, wherein the ternary B—C—N compound has a composition BC$_x$N; wherein x is about 0.2.

4. The method according to claim 1, wherein the ternary B—C—N compound has a cubic structure and a unit cell parameter a; wherein a is about 3.655 Å.

5. The method according to claim 1, wherein the ternary B—C—N compound has a cubic structure and a unit cell parameter a; wherein a is 3.645±0.005 Å.

6. The method according to claim 1, wherein the chemical interaction occurs at a pressure greater than about 6 GPa.

7. The method according to claim 6, wherein the pressure is between about 7.5 GPa and about 8.5 GPa.

8. The method according to claim 1, wherein the chemical interaction occurs at a temperature greater than about 1000° C.

9. The method according to claim 8, wherein the temperature is between about 1400° C. and about 1600° C.

\* \* \* \* \*

UNITED STATES PATENT AND TRADEMARK OFFICE
CERTIFICATE OF CORRECTION

PATENT NO. : 8,449,854 B2
APPLICATION NO. : 12/524951
DATED : May 28, 2013
INVENTOR(S) : Khabashesku et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 840 days.

Signed and Sealed this
Eighth Day of September, 2015

Michelle K. Lee
*Director of the United States Patent and Trademark Office*